(12) United States Patent
Reboredo et al.

(10) Patent No.: US 12,129,456 B2
(45) Date of Patent: Oct. 29, 2024

(54) CONTAINER FOR A FOOD LIQUID, IN PARTICULAR FOR MAKING AND AGEING WINE AND SPIRITS

(71) Applicant: GALILEO SAS, Gondeville (FR)

(72) Inventors: Alejandro Reboredo, Mendoza (AR); Didier Debono, Vina del Mar (CL); Benoît Verdier, Gondeville (FR)

(73) Assignee: GALILEO SAS, Gondeville (FR)

( * ) Notice: Subject to any disclaimer, the term of this patent is extended or adjusted under 35 U.S.C. 154(b) by 882 days.

(21) Appl. No.: 17/260,709

(22) PCT Filed: Jul. 16, 2019

(86) PCT No.: PCT/FR2019/051780
§ 371 (c)(1),
(2) Date: Jan. 15, 2021

(87) PCT Pub. No.: WO2020/016518
PCT Pub. Date: Jan. 23, 2020

(65) Prior Publication Data
US 2021/0277341 A1 Sep. 9, 2021

(30) Foreign Application Priority Data
Jul. 17, 2018 (FR) ...................................... 1856590

(51) Int. Cl.
*C12H 1/22* (2006.01)
*B28B 7/00* (2006.01)
(Continued)

(52) U.S. Cl.
CPC ............. *C12H 1/22* (2013.01); *B28B 7/0029* (2013.01); *B65D 88/744* (2013.01);
(Continued)

(58) Field of Classification Search
CPC ...... C12G 3/00; C12G 1/0213; C12G 1/0209; B65D 88/744
See application file for complete search history.

(56) References Cited

U.S. PATENT DOCUMENTS 2,811,747 A * 11/1957 Belz ........................ B28B 1/20
425/429
4,031,679 A * 6/1977 Feuerlein ................ E02D 27/38
52/294
(Continued)

FOREIGN PATENT DOCUMENTS

| CH | 27801 | 2/1904 |
|----|-------|--------|
| EP | 1785553 | 5/2007 |
| FR | 328410 | 1/1903 |
| FR | 2982275 | 5/2013 |
| FR | 3019831 | 10/2015 |

OTHER PUBLICATIONS

International Search Report issued on International Patent Application No. PCT/FR2019/051780 dated Oct. 9, 2019.

*Primary Examiner* — Thien S Tran
(74) *Attorney, Agent, or Firm* — Perman & Green, LLP

(57) ABSTRACT

A concrete container for a food liquid, particularly for making and aging wine and spirits, includes a container body which exhibits symmetry of revolution. The body includes an interior wall delimiting the storage volume of the container, an external peripheral wall, a first body part and a second body part, which parts are superposed and assembled to close the body, each body part includes an assembly surface for assembly with the other body part. The assembly surfaces include at least: first assembly surfaces placed on the side of the interior wall, the first surfaces exhibiting profiles that mate with one another to ensure continuous contact between the first surfaces, and the first assembly surfaces being extended in the direction toward the outside of the container by second assembly surfaces con- (Continued)

figured to define between them an interior space that may or may not open onto the external peripheral wall.

16 Claims, 4 Drawing Sheets

(51) Int. Cl.
    *B65D 88/74*     (2006.01)
    *C12G 1/02*     (2006.01)
    *C12G 1/028*     (2006.01)
    *C12G 3/00*     (2019.01)

(52) U.S. Cl.
    CPC ......... *C12G 1/0209* (2013.01); *C12G 1/0213* (2013.01); *C12G 3/00* (2013.01); *B28B 2007/005* (2013.01)

(56) References Cited

U.S. PATENT DOCUMENTS

| | | | | |
|---|---|---|---|---|
| 4,060,581 | A * | 11/1977 | Darby | B28B 19/0046 264/343 |
| 4,224,265 | A * | 9/1980 | Pfisterer | B65D 90/507 264/309 |
| 6,493,911 | B1 * | 12/2002 | Troin | E04H 13/008 125/20 |
| 2005/0230864 | A1 * | 10/2005 | Ozasa | B29C 43/36 264/102 |
| 2007/0221819 | A1 * | 9/2007 | Murphy | B28B 7/168 249/1 |
| 2015/0337250 | A1 * | 11/2015 | Bauer | B65D 85/72 408/1 R |
| 2017/0029755 | A1 | 2/2017 | Mostert | |

* cited by examiner

CONTAINER FOR A FOOD LIQUID, IN PARTICULAR FOR MAKING AND AGEING WINE AND SPIRITS

CROSS REFERENCE TO RELATED APPLICATIONS

This application is a National Stage of International Application No. PCT/FR2019/051780, having an International Filing Date of 16 Jul. 2019, which designated the United States of America, and which International Application was published under PCT Article 21(2) as WO Publication No. 2020/016518 A1, which claims priority from and the benefit of French Patent Application No. 1856590, filed on 17 Jul. 2018, the disclosures of which are incorporated herein by reference in their entireties.

BACKGROUND

1. Field

The present disclosure relates to a container intended to contain liquid products such as wine or spirits, or else granular products such as foodstuffs.

It also relates to a mold for creating constituent parts of the body of this container.

2. Brief Description of Related Developments

Tanks for wine making, aging and storing wine are known.

These tanks may be made from stainless steel, from concrete, from plastic or from noble woods such as oak, in order, in this last instance, to impart flavorsome qualities during the aging phase.

It is known that concrete tanks have the advantage of offering good thermal inertia. Thus, they allow the wine to maintain a stable temperature without requiring high expenditure on energy.

It is also less expensive than other materials used in the manufacture of tanks, such as noble woods or stainless steel.

Furthermore, concrete is a material that is outstandingly neutral toward the food liquid with which it is in prolonged contact. It is therefore particularly prized where no direct influence of the tank on the food liquid during its residence therein is sought.

Concrete is also very strong and well suited to the aging of the tank.

Concrete tanks of spherical or ovoid shape are also known.

In addition to offering an undeniably esthetically pleasing appearance, a tank that is spherical in shape offers several advantages.

It encourages convective movements inside the tank, and this ensures that its contents are kept constantly in a state of homogenization, with the temperatures uniformly distributed.

They also offer high storage volumes.

However, it is found that manufacturing these tanks out of concrete remains a lengthy and particularly complex process.

This results in high manufacturing costs.

In addition, these spherical tanks which are intended to receive food liquids need also to conform to strict sealing requirements, which are currently difficult to achieve without fitting an interior lining.

It is not unusual, following maintenance operations on these tanks, to find that this lining has deteriorated, leading to a loss of sealing.

There is therefore still a pressing need for a spherical tank made of concrete the novel design of which allows ease of installation and better sealing.

SUMMARY

The present disclosure seeks to overcome the disadvantages of the prior art by proposing a spherical tank made of concrete that is simple in its design and in its mode of operation, that is particularly easy and economical to manufacture, and that requires no pretreatment of its walls while at the same time offering improved sealing.

One objective of the present disclosure is also such a spherical tank made of concrete that is resistant over time.

Another objective of the present disclosure is such a spherical tank made of concrete that offers diverse functionalities particularly of characterizing and monitoring the food liquid residing in this tank.

The present disclosure also relates to a mold for creating constituent parts of the body of this spherical concrete tank, this mold being particularly simple in its use while at the same time making it possible to obtain smooth surfaces for the internal walls of this tank.

To that end, the present disclosure relates to a concrete container for a food liquid, particularly for making and aging wine and spirits, this container comprising a container body which exhibits symmetry of revolution, said container body comprising an interior wall delimiting the storage volume of said container and an external peripheral wall.

According to the disclosure,
  this container body comprises a first body part and a second body part, which parts are superposed and assembled to close said container body,
  each body part comprising an assembly surface for assembly with the other body part, these assembly surfaces being placed facing one another, these assembly surfaces comprising at least:
  first assembly surfaces placed on the side of said interior wall, these first surfaces exhibiting profiles that mate with one another to ensure continuous contact between same, and
  these first assembly surfaces are extended in the direction toward the outside of said container by second assembly surfaces configured to define, between these second assembly surfaces, an interior space that may or may not open onto said external peripheral wall of the container body.

This container may therefore be a spherical, ovoid or else cylindro-spherical tank made of concrete.

The body of the container is therefore the result of assembling two body parts which are, for example, hemispheres in the case of a container of spherical shape.

Although each body part is preferably of one piece, or else all-in-one, in order to ensure perfect sealing, the disclosure is not restricted to that aspect.

Each body part may itself be the result of assembling subassemblies, for example container-part halves or else quarters.

As a preference, this first body part and this second body part of the container, which parts are superposed in order to assemble them, are configured to ensure assembly through a translational engagement.

Advantageously, when the two body parts are assembled to form the container, the bearing of a first surface of a first body part against the first surface of the other body part is obtained, this continuous-contact surface being positioned on the interior side of the container in order to form a barrier that reduces the contact between the adhesive or sealing ring and the wine.

Of course, the assembly of these two body parts, which thus form the container body, delimits an interior or internal volume for storing liquid products.

In various particular aspects of this container, each having its own particular advantages and capable of numerous possible technical combinations:

an assembly adhesive is placed in this interior space. Advantageously, this assembly adhesive is an adhesive suitable for food contact. As a preference, this adhesive is particularly suitable for food contact with the food liquid intended to be contained in the tank. Alternatively, a sealing element may be placed in this interior space. The interior space may potentially be adapted to the shape of the sealing element such as a sealing ring.

By way of example, this interior space has a rectangular shape when the container is viewed in transverse section or cross section.

said external peripheral wall of said container comprises at least one circumferential channel, said at least one channel being positioned at the level of said assembly surfaces and defining a housing, each housing accepting a clamping means, preferably removable, such as banding, for assembling the two body parts.

In the case of a spherical tank, this circumferential channel therefore has an annular shape. Thus, and advantageously, this circumferential channel may be placed at the level of the equatorial sections of the hemispheres.

said body of the container is spherical.

Each body part therefore has a hemispherical shape and the assembly surfaces are annular.

a first surface of a first body part is recessed or set back with respect to its second surface, whereas the first surface of the other body part projects with respect to its second surface, the projecting first surface having a profile that mates with that of said recessed first surface so as to cooperate with this recessed first surface for assembling said body parts, said first surfaces are, when said container is viewed in transverse section or cross section, in the form of steps or of corrugated shape.

This transverse section of the container is the one obtained on a vertical plane passing through this container when the latter is resting on flat ground.

said assembly surfaces are configured in such a way that at least the interior walls of said body parts are flush with one another so as to ensure the continuity of said interior wall of said container.

Advantageously, this interior wall is continuous so that it exhibits no surface relief liable to constitute a catching surface from which it is difficult to clean off fouling. This is because such fouling has to be removed effectively in order to avoid any bacterial growth liable to impart a bad taste to the liquid product contained in the container.

Better container hygiene is thus assured.

this container comprises one or more ducts for the circulation of a cooling fluid and/or of a hot fluid and which are arranged at least in part on the external surface of each body part and/or at least in part incorporated into the thickness of each body part, this container comprises one or several elements selected from the group comprising a sensor, a temperature sensor, a conduit of a circuit supplying heating or cooling fluid, these elements preferably being incorporated into the thickness of each body part The present disclosure also relates to an assembly comprising a container as described hereinabove and a stand for supporting the body of said container, this stand having a triangular transverse section.

This stand has a flared shape, its triangular lower part or base being extended toward its upper end by a truncated pyramid shape.

Alternatively, the present disclosure also relates to a pivoting assembly comprising:

a container as described hereinabove, a device for driving this container in rotation, one or more guide elements for guiding the rotation of at least one coupling device solid with the external peripheral wall of the body of this container, and a base for rotationally supporting said container and accepting said at least one rotational-drive device.

Advantageously, each coupling device comprises an engagement ring and a central bowl solid with this engagement ring, this central bowl comprising an assembly portion for assembly with the external peripheral wall of the container body, said assembly portion comprising centering elements for centering with respect to, or being configured to mate with, that portion of said external peripheral wall on which it bears, two coupling devices mounted one on each side of said body defining an axis of rotation of said container that coincides with the center of each engagement ring, said container comprising a discharge opening arranged on said body in such a way that at least some of the liquid contained in said container can be removed when said container is tilted about said axis of rotation.

By way of example, this container comprises two coupling devices mounted one on each side of said body and arranged to define a horizontal or substantially horizontal axis.

According to one aspect of this pivoting assembly, this drive device comprises at least one rotary drive wheel comprising a groove to receive at least the peripheral edge of an engagement ring and a motive power unit to drive the rotation of said rotary drive wheel.

According to another aspect of this pivoting assembly, with the peripheral edge of an engagement ring comprising an annular gear, said drive device comprises a complementary gear calibrating with the annular gear of said engagement ring in order to drive the latter in rotation, said annular gear being solid with a drive shaft actuated by a motive power unit or a cranking handle.

According to yet another aspect of this pivoting assembly, said rotational-guidance elements are chosen from the group comprising rotary wheels comprising a groove to receive the peripheral edge of an engagement ring, rotary solid wheels and combinations of these elements.

The present disclosure also relates to a mold for manufacturing from concrete a body part of the container as described hereinabove.

According to the disclosure, this mold comprises two hemispherical and concentric mold walls between them determining an interior space to receive said concrete, said mold walls being joined together at their largest section, or equatorial section of each hemisphere, by a connecting ring, the internal face of said connecting ring having a surface relief configured to determine said assembly surfaces of said corresponding mold part.

This mold advantageously allows smooth interior walls to be obtained directly. What is meant here by "smooth" is a wall that is nonporous. There is therefore no need for the interior wall of each mold part to be reworked, for example in a polishing step.

This mold can be made of wood, metal, plastic or of a composite material such as a fiber-reinforced elastomer-based composite. By way of example, this composite may be a glass fiber-reinforced polyurethane.

It may receive a coating facilitating the demolding of the body part and imparting a smooth surface on the latter. This coating may be formed of one or more coats of paint or of varnish. It may alternatively be a coating of vegetable oil.

According to one aspect, the outermost mold wall comprises an opening for the introduction of a liquid concrete which spreads itself through said space.

As a preference, this opening is placed at the upper end of the corresponding mold wall.

According to another aspect, at least said two mold walls are made from a glass fiber-reinforced thermoplastic resin.

According to yet another aspect, with this mold being a mold for the vibration molding of concrete products, it comprises a bearing surface configured to support it on a vibrating table.

According to yet another aspect, this mold comprises a device for forming a surround for a hatch in the mold body part.

By way of example, this device comprises at least one frame configured to delimit an orifice in the thickness of the wall and at least one boxing-out element intended to be assembled with this frame in order to define a hatch surround.

The present disclosure also relates to a wet concrete composition for the manufacture of a body part of the container as described hereinabove, this concrete composition being made up of a hydraulic binder, of stone-based aggregate with a diameter $D_{max}$ less than or equal to 6 mm, a fibrous reinforcement, rigid light-weighting compounds and mixing water. This composition may also contain a plasticizer.

According to one aspect, this hydraulic binder is a cement CEM I 42.5 of the normal or reactive type, i.e. which has a strength of 42.5 $N/mm^2$.

According to another aspect, this fibrous reinforcement contains mineral fibers.

As a preference, said mineral fibers contain shrinkage-preventing short glass fibers and long glass fibers for structural reinforcement. Advantageously, these glass fibers are configured to be resistant to chemical environments, and notably to alkaline environments.

According to yet another aspect, these rigid light-weighting compounds are expanded perlite and/or expanded cork particles and/or expanded clay.

As a preference, these compounds have uniform, or relatively uniform, dimensions comprised between 2 mm and 6 mm.

The stone-based aggregate may, in the known way, contain sand and/or granulate.

BRIEF DESCRIPTION OF THE DRAWINGS

Further advantages, objects and particular features of the present disclosure will become apparent from the following description given, by way of entirely nonlimiting explanation, with reference to the attached drawings in which.

DETAILED DESCRIPTION

Figure 1:
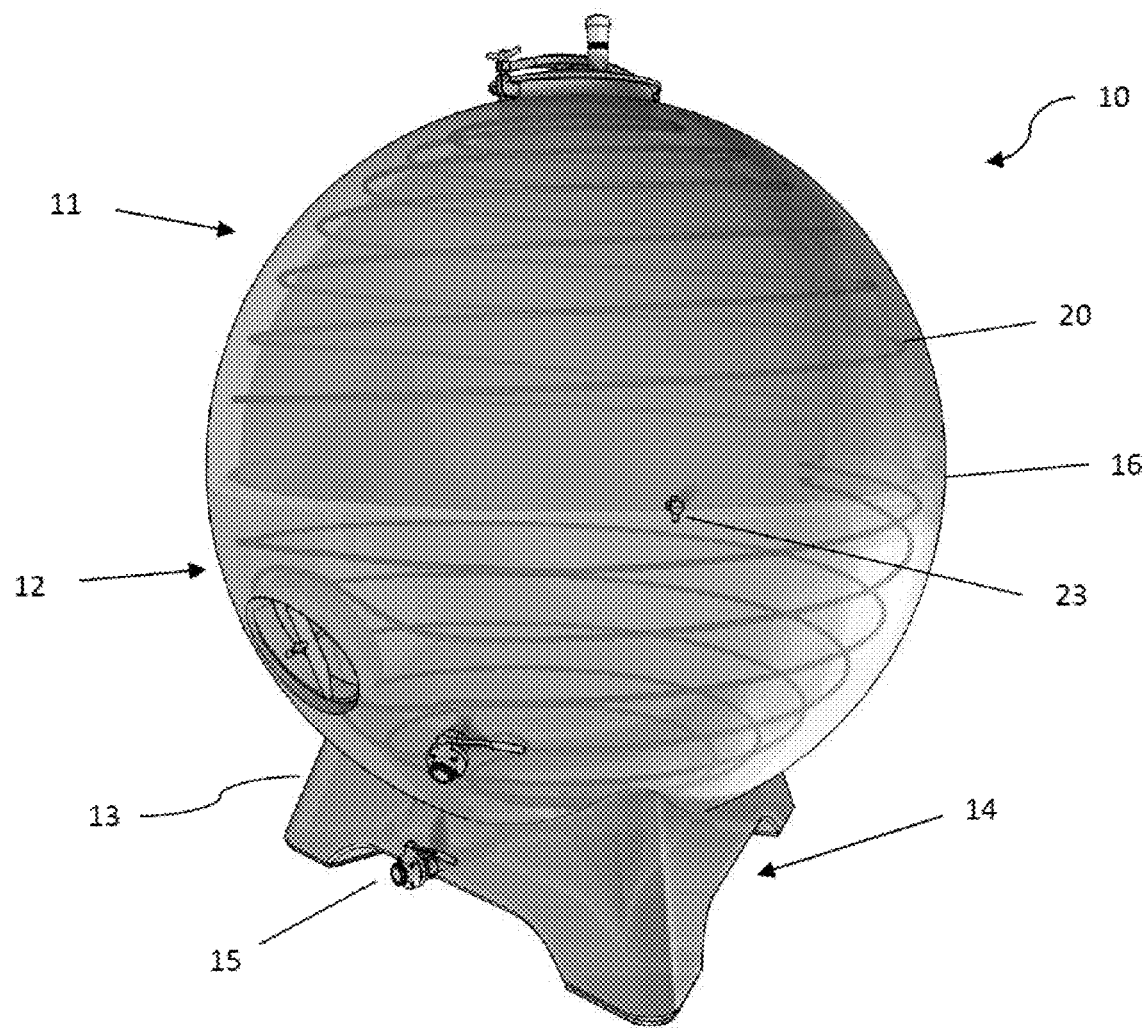
FIG. 1 is a perspective view of a spherical tank made of concrete according to one particular aspect of the present disclosure, a circuit for controlling the temperature of the contents of this tank being shown as internal detail.
Figure 2:
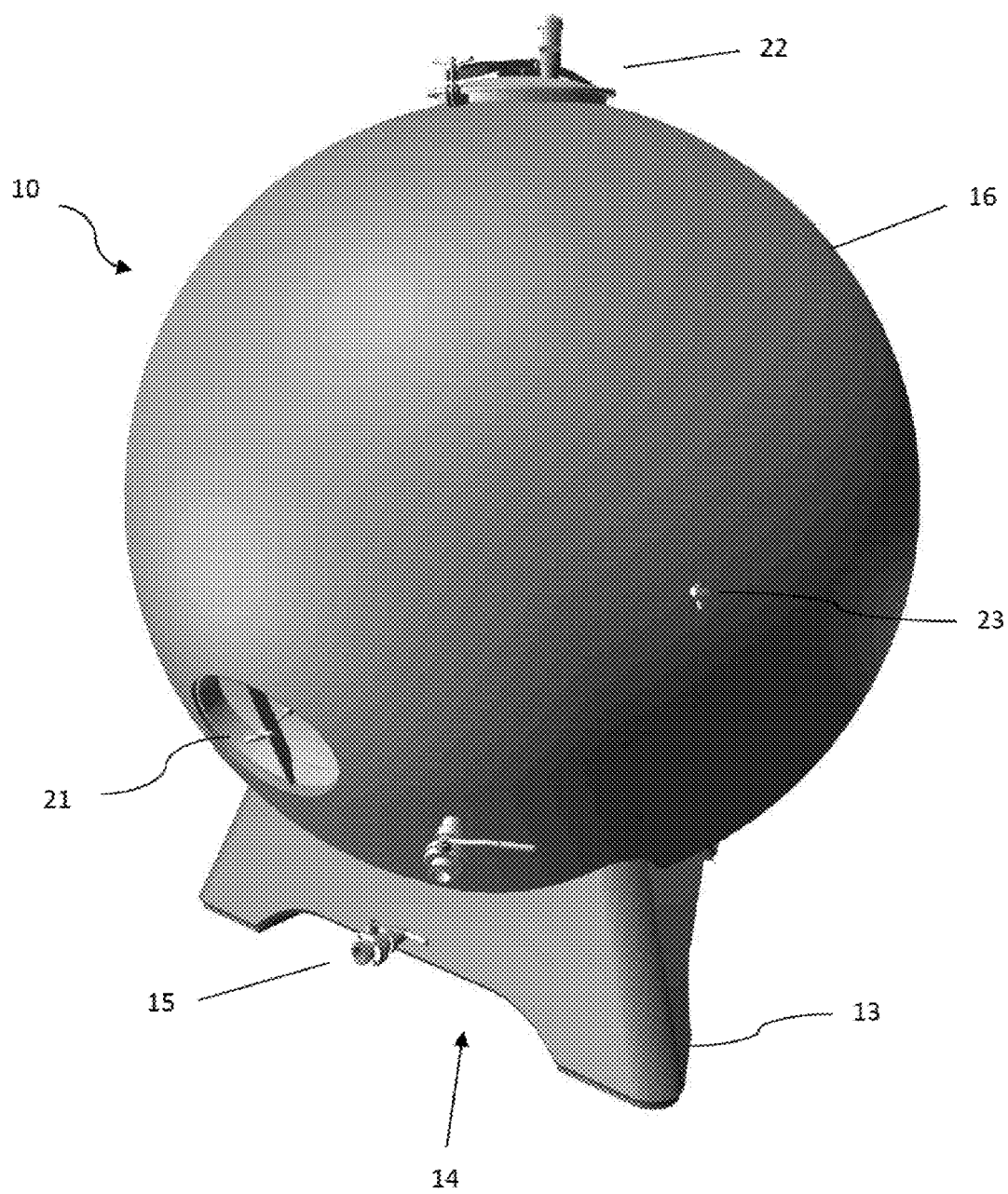
FIG. 2 is a side view of the spherical concrete tank of FIG. 1.
Figure 3:
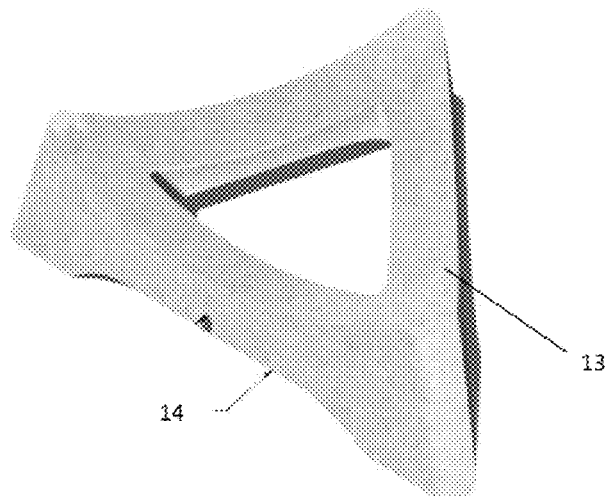
FIG. 3 is a perspective view of the stand of the spherical concrete tank of FIG. 1.
Figure 4:
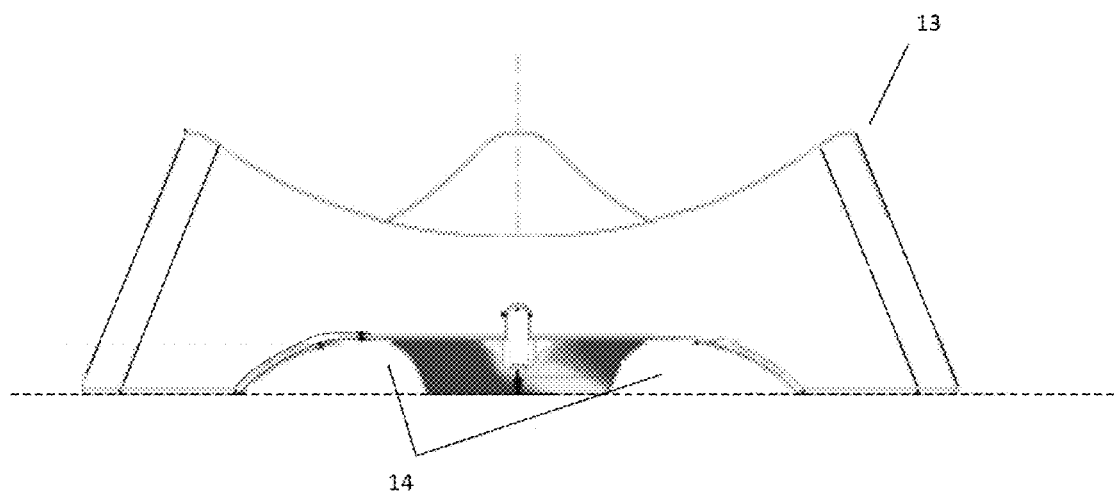
FIG. 4 is a profile view of the stand illustrated in FIG. 3.
Figure 5:
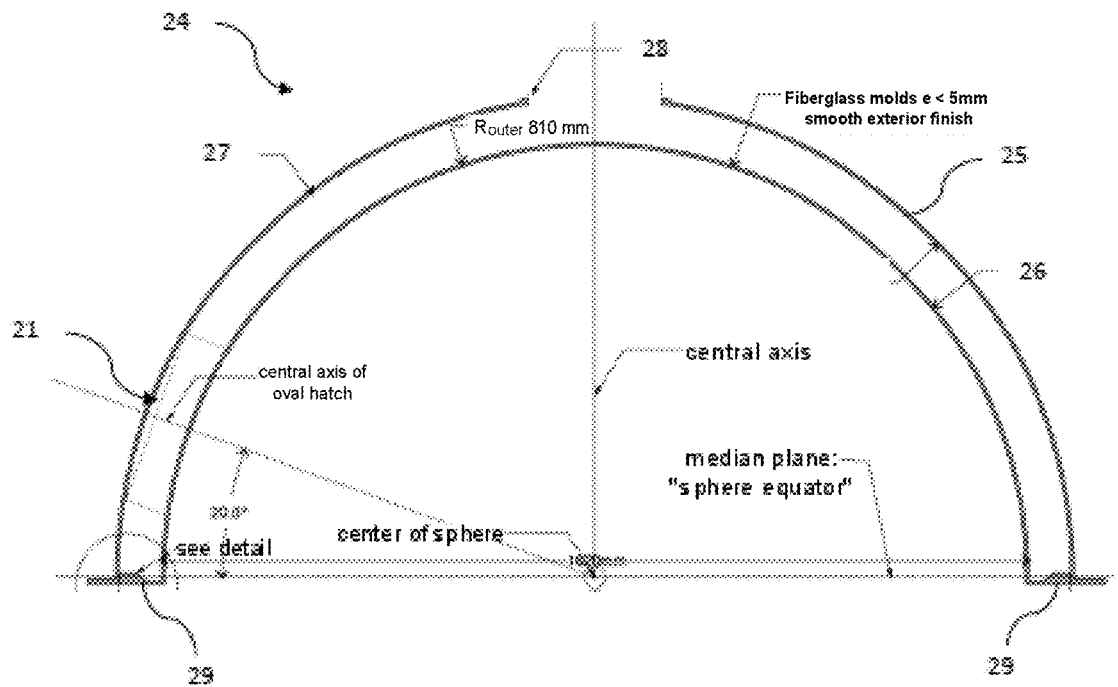
FIG. 5 schematically depicts a mold used to obtain a hemisphere of the spherical concrete tank of FIG. 1, according to one particular aspect of the present disclosure.
Figure 6:
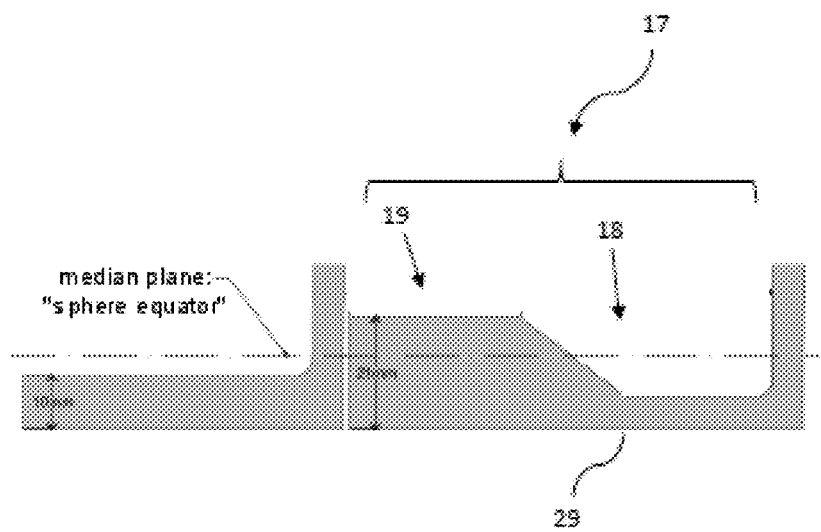
FIG. 6 is a partial and enlarged view of the ring connecting the walls of the mold of FIG. 5, the interior surface of this ring determining the assembly surface of this hemisphere.

First of all, it must be noted that the figures are not drawn to scale. A spherical tank 10 made of concrete according to one particular aspect of the present disclosure is described with FIGS. 1 to 4. This spherical concrete tank 10 is advantageously intended for producing and aging wine and spirits.

This tank 10 comprises a hollow tank body formed by assembling two concrete hemispheres 11, 12. Each hemisphere 11, 12 is of one piece in order to guarantee good sealing of this tank.

Purely by way of illustration, this tank 10 has a nominal volume of 1500 L, a tank wall thickness of the order of 8 cm, and an unladen weight of 1170 kg.

The body of this tank is supported by a stand 13. This hollow stand 13 has a base, or lower part, of triangular shape, extending toward its upper end in a truncated pyramid shape so that the latter coincides with the spherical shape of the tank 10.

This hollow stand 13 which, in this instance, is made of reinforced concrete, is particularly strong and stable. The base of this stand 13 has recesses 14 to receive the forks of a transport unit such as a fork-lift.

This stand 13 also has a cutout for a tap 15 for draining the spherical concrete tank 10.

The body of this tank 10 has an interior wall delimiting a space for receiving wine or spirits, this receiving space having a spherical overall shape. In order to encourage the movement of the liquid in the tank 10, this interior wall is completely smooth. The exterior peripheral wall 16 of this tank 10 is also spherical.

Each hemispherical shaped body part 11, 12 has, at its equatorial section, an assembly surface 17 for assembly with the other body part, which is directed toward the outside so that, with the body parts 11, 12 superposed, these assembly surfaces 17 come into contact to ensure sealed assembly thereof. These assembly surfaces 17 are also intended to facilitate nested-together assembly of the two body parts 11, 12 to form the spherical concrete tank 10.

The invention claimed is:

1. A concrete container for a food liquid for making and aging wine and spirits, said container having a container body presenting a spherical, ovoid, or cylindro-spherical shape, said body comprising an interior wall delimiting a storage volume of said container and an external peripheral wall, characterized in that said body is comprised of a first body part and a second body part, which parts are superposed and assembled to close said body, an internal volume defined by said body being intended to receive said food liquid, each body part comprises an assembly surface for assembly with the other body part, said assembly surfaces being placed facing one another, said assembly surfaces comprising at least:

first assembly surfaces placed on a side of said interior wall, said first surfaces exhibiting profiles that mate with one another to ensure continuous contact between said first surfaces, said first assembly surfaces being extended in a direction toward an outside of said container by second assembly surfaces configured to define between them an interior space that may or may not open onto said external peripheral wall, said interior space being defined to receive an assembly adhesive or a sealing element, and said assembly surfaces are configured in such a way that at least the interior walls of said body parts are flush with one another so as to ensure a continuity of said interior wall of said container.

2. The container as claimed in claim 1, characterized in that the concrete container comprises two container body parts assembled with one another, each body part being of a single piece.

3. The container as claimed in claim 1, characterized in that an assembly adhesive is placed in said interior space.

4. The container as claimed in claim 3, characterized in that said assembly adhesive is an adhesive suitable for food contact.

5. The container as claimed in claim 1, characterized in that a sealing element is placed in said interior space.

6. The container as claimed in claim 1, characterized in that said external peripheral wall of said container comprises at least one circumferential channel, said at least one channel being positioned at a level of said assembly surfaces and defining a housing, each housing accepting a clamping means for assembling the two body parts.

7. The container as claimed in claim 1, characterized in that said body is spherical.

8. The container as claimed in claim 1, characterized in that a first surface of a first body part is recessed or set back with respect to a second surface, whereas the first surface of the other body part projects with respect to the second surface, the projecting first surface having a profile that mates with that of said recessed first surface so as to cooperate with this recessed first surface for assembling said body parts.

9. The container as claimed in claim 1, characterized in that said first surfaces are, when said container is viewed in transverse section or cross section, in a form of steps or of corrugated shape.

10. The container as claimed in claim 1, characterized in that said assembly surfaces are configured in such a way that at least the interior walls of said body parts are flush with one another so as to ensure a continuity of said interior wall of said container.

11. The container as claimed in claim 1, characterized in that the concrete container comprises one or more ducts for a circulation of a cooling fluid and/or of a hot fluid and which are arranged at least in part on the external surface of each body part and/or at least in part incorporated into a thickness of each body part.

12. The container as claimed in claim 1, characterized in that the concrete container comprises one or several elements selected from the group comprising a sensor, a temperature sensor, a conduit of a circuit supplying heating or cooling fluid, these elements preferably being incorporated into the thickness of each body part.

13. An assembly comprising a container as claimed in claim 1 and a stand for supporting the body of said container, the stand having a triangular transverse section.

14. An assembly comprising a container as claimed in claim 1, said container comprising at least one coupling device solid with the external peripheral wall of the body of said container, a device for driving said container in rotation, one or more guide elements for guiding the rotation of said at least one coupling device, and a base for rotationally supporting said container and accepting said at least one rotational-drive device.

15. A mold for manufacturing in concrete a body part of a container as claimed in claim 1, characterized in that said mold comprises two hemispherical and concentric mold walls between them determining an interior space to receive said concrete, said mold walls being joined together at their largest section, or equatorial section of each hemisphere, by a connecting ring, an internal face of said connecting ring having a surface relief configured to determine said assembly surfaces of said corresponding mold part.

16. The mold as claimed in claim 15, characterized in that at least said two mold walls are made from a glass fiber-reinforced thermoplastic resin.

* * * * *